United States Patent Office

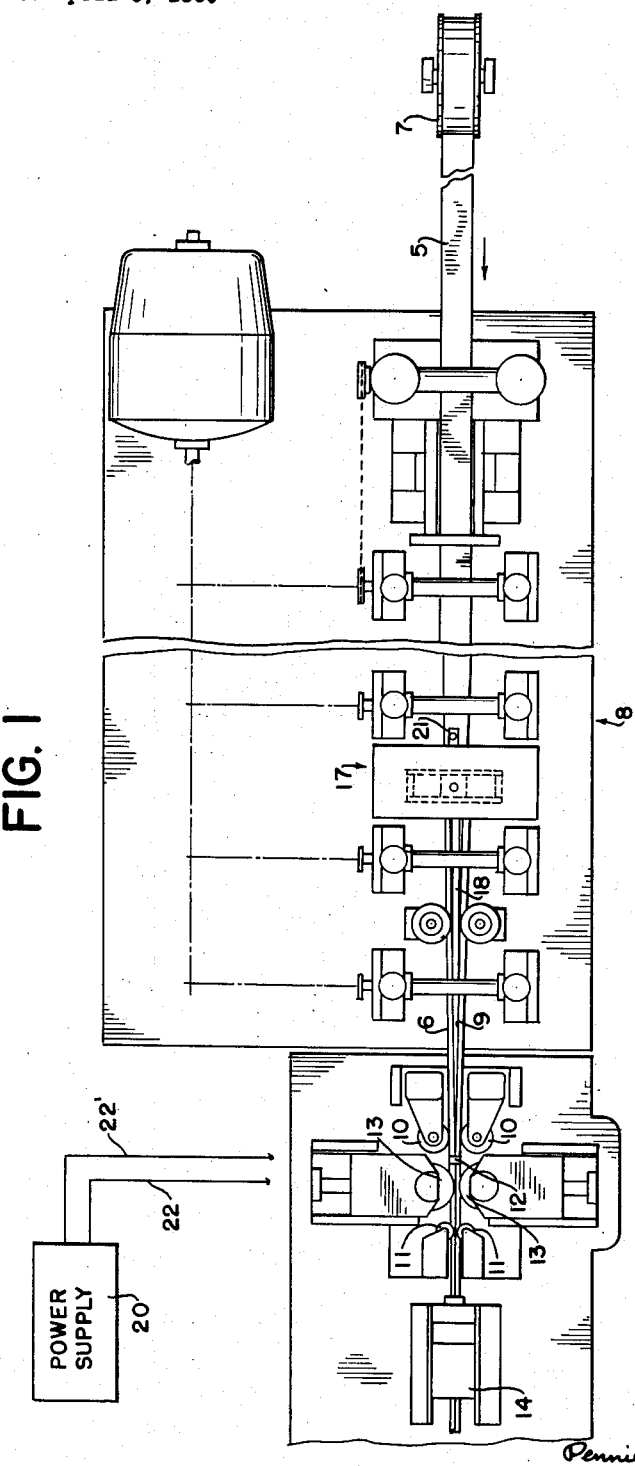

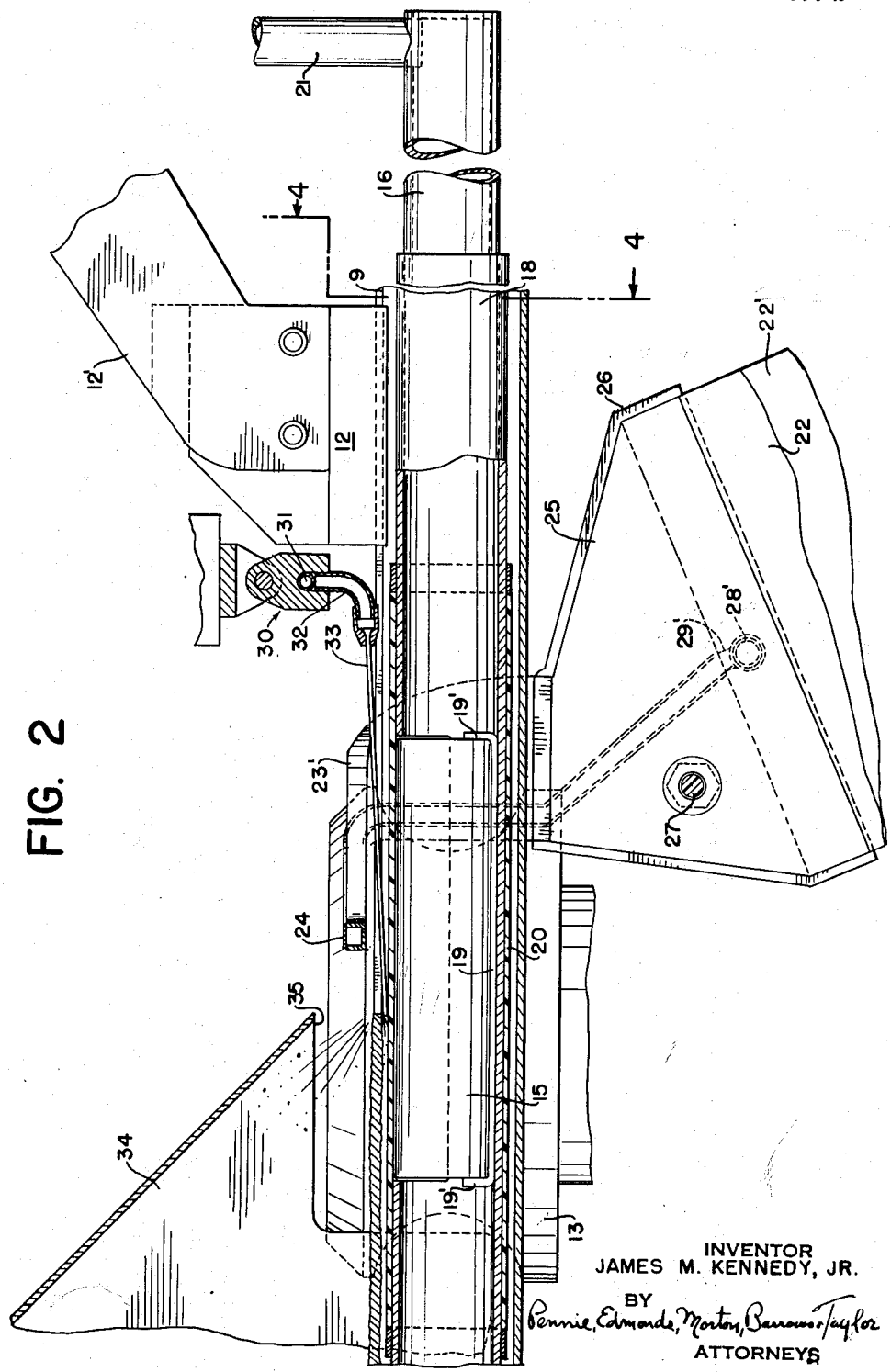

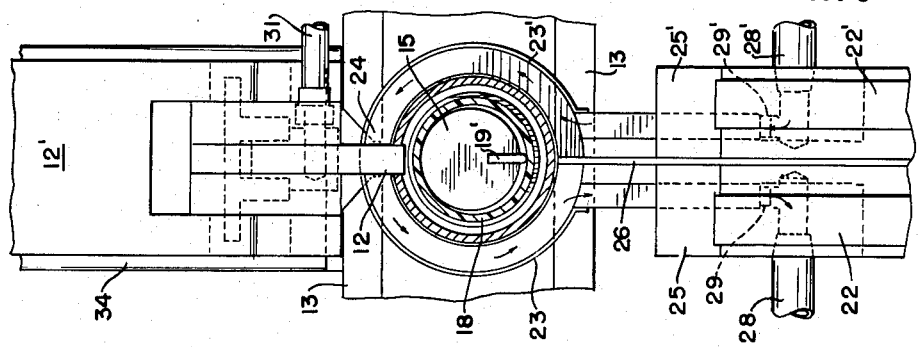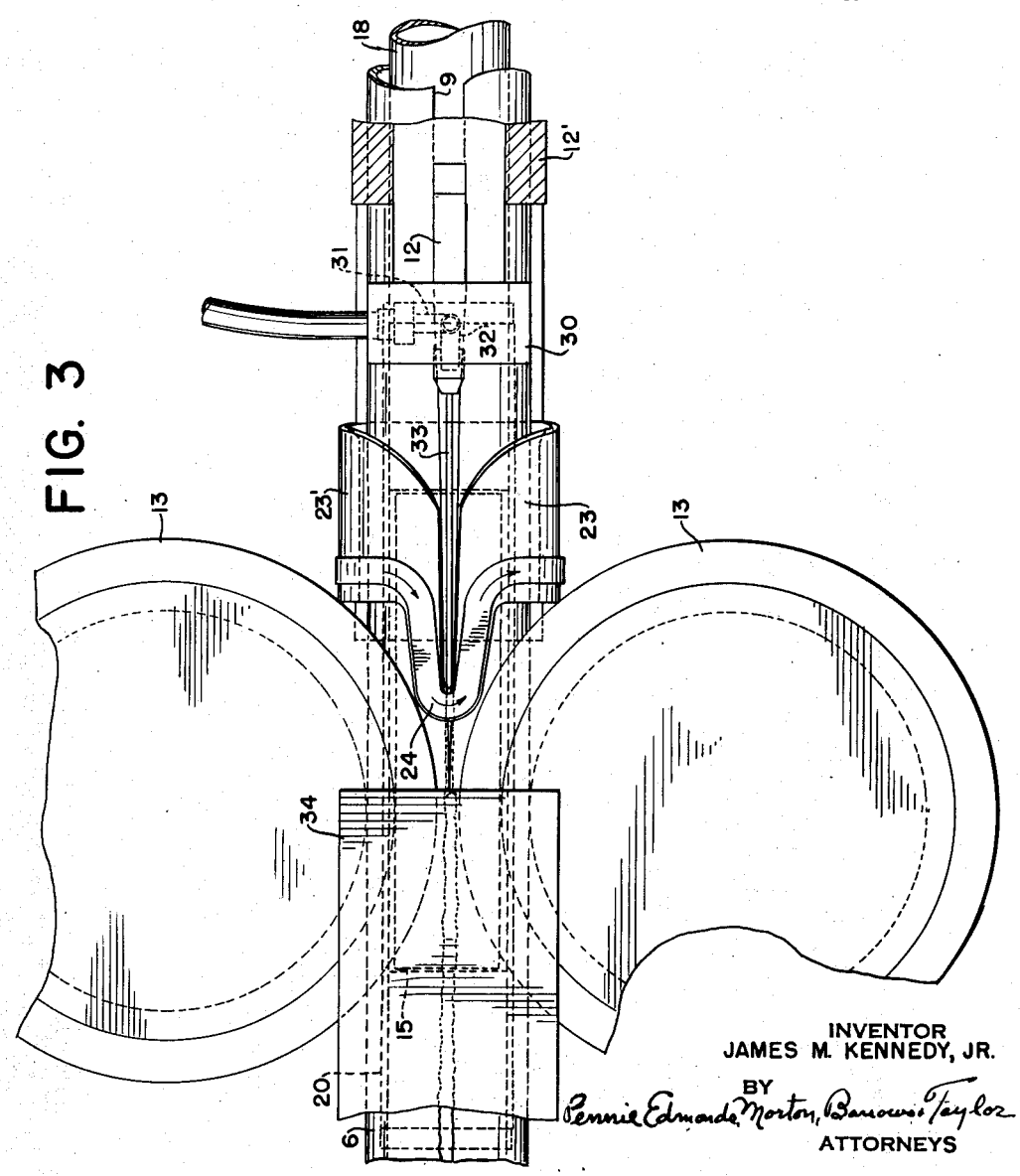

3,072,771
Patented Jan. 8, 1963

3,072,771
INDUCTION WELDING OF TUBES
James M. Kennedy, Jr., Rome, N.Y., assignor to Revere Copper and Brass, Inc., New York, N.Y., a corporation of Maryland
Filed Apr. 3, 1959, Ser. No. 803,969
7 Claims. (Cl. 219—8.5)

This invention relates to the electric induction welding of tubes and has for its object the provision of certain improvements in the induction welding of tubular shapes of any weldable metal. More particularly, the invention aims to improve the performance of apparatus for the induction welding of tubing by increasing the electrical efficiency of the induction coil, where such efficiency is measured by the amount of electrical power induced in the tube divided by the amount of electrical power available at the input of the induction coil. As a consequence of such increased efficiency, more heat is developed at the welding zone in the tube and satisfactory welding is attained at higher speeds than possible by the heretofore conventional methods of induction welding. The invention further aims to improve the performance of apparatus for the induction welding of tubing by giving proper consideration to the full utilization and effectiveness of the various elements included in the apparatus, whereby continuous operation of the apparatus is assured. The invention aims to improve the performance of apparatus for the induction welding of tubing.

Machines for welding tubes by the electric induction method and by the electric resistance method are well-known in the art, and are adapted to weld into tubular shape a strip of any weldable metal such as steel, copper, copper-base alloys, etc. Commonly, the metal strip is initially formed into a tubular, open-seam shape and the resulting tubular shape is progressively passed through a welding zone, where the edges of the seam are electrically heated to welding temperature and the heated edges are forced together by pressure rolls to effect the weld. In the induction welding method, an induction coil, positioned around the tubular shape, induces an electric current in the tubular shape. The action is essentially that of a transformer with the single or multi-turn induction coil functioning as the primary and the tubular shape as the secondary.

The magnetic field established by the current flow in the induction coil is opposed by the magnetic field established by the current flow induced in the tubular shape. The net result is the cancelling of a portion of the inductive reactance in each component and the lowering of the impedance (i.e., an increase in the conductance) of the combination of induction coil and tubular shape. If the magnetic field established around the induction coil and the opposing magnetic field established around the tubular shape are forced to follow the same path, this cancelling effect will be at its maximum. The inductive reactance in the tubular shape will then be eliminated and the inductive reactance in the induction coil will be reduced to the minimum value.

It has been well known in the transformer art that a magnetic core increases the completeness with which the magnetic field or flux established around the transformer primary follows the same path as the field established around the transformer secondary. However, magnetic cores have heretofore been given only brief and superficial consideration in the art of welding tubes by the induction method. While the use of cores located internally and externally in relation to the tube being welded have been proposed and have been used at various times, there has been a failure to realize that certain conditions and precautions must be observed in order to insure continuous operation of the apparatus and to obtain the full effectiveness of the various elements and particularly of the internal magnetic core. The present invention is concerned with tube welding apparatus having a permeable magnetic member within the tubular shape to be welded by an electric current of high frequency induced in the shape by a surrounding induction coil proximate to the zone of welding. Conveniently, the magnetic member may be mounted in the scarfing tool assembly which is commonly anchored in the forming mill where the metal strip is formed into the open seam tubular shape. The formed shape is progressively advanced through a seam guide or spreader into the welding zone of an induction welding machine where the edges of the seam are promptly heated to welding temperature by the induced electric current of increased strength resulting from the presence of the magnetic member within the tubular shape. The heated edges of the seam are forged together by pressure rolls to effect a weld. The induction coil is positioned slightly in advance of the application of the forging pressure in the heavy induced current flows along the approaching edges of the seam to the point where the seam is closed by the forging pressure and thence circumferentially around the tube.

I have discovered that a permeable magnetic core positioned within a closed seam or seamless tube has no effect on the electrical characteristics of the coil-tube combination. A closed ferromagnetic tube provides a path for the magnetic field and the core mounted within the tube is, therefore, ineffective. A closed tube of diamagnetic characteristics (those materials which, when in a magnetic field, tend to move to the weakest portion of the field, such, for example, as copper, copper-base alloys, aluminum etc.) tends to repel the magnetic field and, in this case, the core is also ineffective. Hence, to be effective, the magnetic core must be mounted within an open seam tubular shape, and I have discovered that the open seam must be of reasonable width and that the magnetic core must be mounted as close to the open seam as is practical. If these conditions are carefully met in the arrangement of the welding apparatus, the effect of the magnetic core in improving the conductance of the coil-tube combination is appreciable and tangible benefits can be obtained.

A unique and troublesome concomitant of the induction welding of diamagnetic materials is the so-called "spatter" of small particles of molten metal. At and near the point where the weld takes place, there is an intense flow of current on the extreme surface of the open seam edges leading to the point of welding. Because of this intense current flow, a small portion of metal is elevated to a temperature sufficient to bring this surface skin of metal to a molten state. Also because of the intense current flow, an equally strong magnetic field is established about the weld area. When welding diamagnetic materials, the molten metal is violently expelled from this magnetic field in the form of small particles and, in turn, the particles adhere to the various parts of the surrounding apparatus. In the welding of certain materials such as aluminum, copper and copper-base alloys, the difficulty is so severe as to cause very frequent stopping of the apparatus in order to remove the spatter. If the spatter is not removed, mechanical and electrical failures are liable to occur which will force stoppage of the equipment. I have discovered that a glazed ceramic sleeve mounted within the metallic tube being welded and surrounding the internal magnetic core will protect the core not only from spatter but also from the intense heat developed at the weld point. Since the ceramic sleeve has no effect on the magnetic field and since it is a non-conductor of electrical current, it does not in any way affect the electrical characteristics of the apparatus. Any spatter that does strike the glazed outside surface of the ceramic sleeve is removed by a suitable jet of fluid coolant such as a continuous air blast. In order to remove the spatter generated at the weld point on the outside of the metallic tube being welded, a high velocity exhaust system and pick-up nozzle is provided.

The invention is based on the foregoing discoveries and will be better understood from the following description taken in conjunction with the accompanying drawings in which:

FIG. 1 is an explanatory top plan, partially diagrammatic, of an induction welding apparatus in which the improvements of the invention are advantageously embodied, FIG. 2 is a side elevation, mostly in section, of the induction welder of FIG. 1 embodying the improvements of the invention, FIG. 3 is a top plan of the welder, and FIG. 4 is a sectional end elevation taken on the section line 4—4 of FIG. 2.

Since the contemplated effect of the magnetic core or member is to increase the conductance (by reducing the impedance) of the combination of induction coil, tubular shape and magnetic member, the latter has come to be known as a conductance core. It is made of magnetic material of high permeability and with low inherent hysteresis and eddy current losses. Advantageously, it may be made of a magnetic oxide material which is compressed into the desired shape and sintered. The core is conveniently of generally cylindrical form, several inches in length, and suitably mounted within the tubular shape undergoing welding.

Referring now to FIG. 1 of the drawings, the strip of weldable metal 5 to be formed into a suitable open-seam tubular shape 6 for welding is fed from a payoff reel 7 into a multi-stand forming mill 8 of conventional design. As viewed in this figure, the longitudinal open seam 9 is at the top of the tubular shape and the shape is progressively advanced into an induction welder having entry and exit guide rolls 10 and 11, respectively, and a seam guide or spreader 12 to keep the seam open until its edges, heated to welding temperature, have been advanced to the pressure rolls 13. The seam guide is detachably mounted between brackets 12' carried by a stationary part of the welder. The welded tube is progressively advanced through the outside scarfing tool 14, and thence through the quenching unit, sizing unit and cutoff unit onto a runout table, all of conventional design, and hence not shown in FIG. 1.

The conductance core 15 is conveniently mounted in the inside scarfing tool assembly as shown in FIG. 2. At its forward end, the assembly has a mandrel 16 for anchoring the assembly between the 5th and 6th stands of the 7-stand forming mill 8 as diagrammatically indicated at 17 in FIG. 1. A long tube 18 of non-magnetic material (e.g. brass, aluminum, non-magnetic stainless steel etc.) is secured to and extends forwardly from the mandrel anchor 16 to the inside scarfing tool (not shown but appropriately supported within the welded tube beyond the position of the outside scarfing tool 14). In the vicinity of the welding zone the upper half of the tube 18 is cut away for a length slightly longer than the conductance core 15. The core is inserted through this cutaway section and rests on a rod or cradle 19 welded or otherwise suitably secured to the bottom of the tube 18 and having upturned ends 19' for holding the core in position. The tube 18 is surrounded and enveloped by a close-fitting sleeve 20 of insulating and heat-resistant material covering the cutaway section housing the conductance core and extending a short distance beyond each end of the core. The sleeve may be made of a ceramic material such as aluminum oxide or any other material which is non-magnetic and will not conduct an electric current, and which will withstand a certain amount of heat from the weld arc. In accordance with the invention, the sleeve 20 has a smooth, glazed or highly polished outside surface in order to prevent the adhesion of the spatter generated at the weld point.

At its forward end, the tube 18 is connected to the mandrel 16 which in turn is connected to an upstanding coolant inlet tube 21, the bores of the tubes 18 and 21 communicating with a bore in the mandrel to form a coolant conduit to the inside scarfing tool. The inlet tube 21 extends upwardly through the advancing open seam 9 of the tubular shape between the fifth and sixth stands of the forming mill. The inlet tube is connected to a suitable source of liquid coolant (e.g., soluble oil and water) which flows through the tube 18 and around the conductance core 15 to the inside scarfing tool. The coolant serves two purposes: In passing down the length of the conduit, it first serves to cool the conductance core, and then passes on to the inside scarfing plug to cool the inside scarfing tool. There is always a certain amount of eddy current and hysteresis loss in the magnetic material of the conductance core, and the heat developed within the core, in consequence thereof, is removed to the necessary extent by the coolant.

The power supply 20 (e.g., a high frequency generator within the range of 400–500 kilocycles) and electrical equipment (e.g., high frequency power transformer etc.) for the induction coil are of conventional design and only diagrammatically indicated on FIG. 1 of the drawing. The output leads 22—22' of the high frequency power transformer are connected to a single or multi-turn induction coil. Merely by way of example, the induction coil shown in the drawings is a single turn coil machined from a solid bar of copper and comprises two semi-cylindrical members 23 and 23' terminating at their tops in a water-cooled harpin point 24 over the weld area. The members 23 and 23' surround the tubular shape 6, and terminate at their lower ends, below the shape 6, in terminal plates 25—25' connected electrically to the transformer output leads 22—22', respectively. The terminal plates are separated by a thin sheet of heat-resistant insulating material 26, and are held together in contact with the insulating sheet by a bolt and nuts 27 of insulating material. The terminal plates have cooling-water connections 28—28' communicating with passages 29—29' drilled in the plates (25—25') and the semi-cylindrical members (23—23'), and communicating with the cooling-water passage in the hairpin point 24. The arrows in FIGS. 3 and 4 indicate the flow of cooling water through the induction coil and hairpin point.

An important aspect of the present invention is the means provided to minimize the spatter problem. As previously pointed out, the intensity of the current flow along the edges of the open seam, at the welding area, sets up an equally intense magnetic field and melts a slight amount of metal at the tip of the seam (weld point). It is in the nature of any non-magnetic material to be repelled from a point of high magnetic field to a point of weak or no magnetic field. Thus, the non-magnetic molten metal at the weld point is violently expelled as spatter from the intense magnetic field at that point and congeals and sticks to various parts of the welding apparatus. I have found that unless this spatter is removed continuously during welding, the apparatus will become so incrusted that electrical failures result. The spatter difficulty is extremely severe with aluminum and with copper-zinc alloys. It is bad in welding copper, and troublesome in welding cupro-nickel and stainless steel alloys.

In accordance with the invention, a high velocity jet of a suitable fluid coolant, such as water, air or the like, is directed against the ceramic sleeve 20 just under the point of welding, for continuously removing the spatter that is ejected on the inside of the tubular shape. Thus, immediately behind the seam guide 12, a coolant nozzle assembly 30 is suitably attached to a stationary part of the welding apparatus. The lateral bore 31 of the assembly is connected to a suitable source of the fluid coolant under pressure. A tubular elbow 32 is connected to the vertical bore of the assembly just above the open seam 9 in the tubular shape. A long needle-like nozzle or discharge tube 33 is coupled to the elbow 32, and extending downwardly through the open seam 9 is adapted to direct a high velocity jet of fluid coolant against the spatter forming on the inside of the tubular shape and tending to adhere to the sleeve 20. The molten metal particles of spatter are promptly congealed by the coolant and the congealing and congealed particles are flushed rearwardly and away from the welding area. The smooth, glazed or polished surface of the sleeve is further protection against the adherence of spatter to the sleeve.

A suction exhaust nozzle or hood 34 is positioned over the induction welder with the forward end of its mouth 35 just above the weld point. The suction of the hood is sufficient to pull away from the weld area the spatter ejected on the outside of the welded tubular shape.

It has been previously pointed out that the width of the open seam 9 must be appreciable and the conductance core 15 must be positioned as close to the open seam as practicable in order for the conductance core to have the desired beneficial effect in the electrical circuit. I have found that a partially or almost completely closed seam under the induction coil causes the conductance core to be almost completely shielded by the tubular shape from the magnetic field set up by the current flow in the induction coil. Under such conditions there is no effect, beneficial or otherwise, from the conductance core. However, when the seam is maintained of a reasonable width (say within the range of about ¼ to ½ inch) at a distance of about 4 to 7 inches in advance of the welding zone the conductance core has the advantageous effect of increasing the electrical efficiency of the induction coil with the attendant increase in the heat developed at the welding area and a pronounced increase in the speed of welding. In addition to the appreciable width of the seam at an appreciable distance in advance of the weld point, the conductance core should extend a few inches (e.g. 3 to 4 inches) on each side of the weld point, and should be mounted as high as possible in order to bring it as close to the seam as practicable. When the foregoing conditions are observed, the conductance core effects a greater linkage of the induction coil field with the field established around the tubular shape and reduces the distortion effect of the coil field by the field established by the opposing induced current in the tubular shape. The practical result is to permit a heavier flow of current in the tubular shape.

The optimum appreciable width of the open seam will vary with the diameter and wall thickness of the tubular shape, but is susceptible of accurate determination when the principle of the necessary conditions is understood. By way of example, in welding tubular shapes 1.25 to 2 inches in diameter having a wall thickness of 0.08 inch, very satisfactory results are obtained with a seam width of ⅜ inch at about 4¾ inches in advance of the weld point. In welding a tubular shape 1 inch in diameter having a wall thickness of 0.04 inch, excellent results have been obtained with a seam width of 5/16 inch at about 4¾ inches in advance of the weld point. In general, the narrow triangle formed by the edges of the open seam between the seam guide and the weld point varies within the range of about 4° and about 5° at the apex.

The following examples (illustrative and in no sense restrictive of the scope of the invention) indicate the improved performance of a present day conventional induction welder when equipped with the novel features of the invention. The conductance core was made of a magnetic oxide (ferrite) material, pressed into the form of a cylinder (½ inch in diameter and 6 inches long) and sintered. The core was mounted as high as practicable with its center approximately under the weld point. The power supply was a 450 kilocycle generator having an oscillator delivering 50 kilowatts at approximately 5,000 volts to the primary of a high frequency transformer whose secondary (stepped down to about 500 volts) was connected to the leads 22 of the induction coil where the current was about 3,500 amperes at full load.

The seam guide was approximately ¼ inch wide and was located in front of the induction coil, approximately 4½ inches in advance of the welding zone. With this equipment, tubes of 1 inch outside diameter and 0.035 inch gauge of low carbon steel material, were welded at the rate of at least 280 f.p.m. The same equipment without a conductance core was able to weld the same type of tube at a maximum rate of only 75 f.p.m. With the same equipment, using the conductance core, deoxidized copper tubes of 1 inch outside diameter and 0.040 inch gauge were welded at the rate of at least 150 f.p.m. Without a conductance core the maximum speed obtainable in welding the same type of tube was about 40 f.p.m. In both cases, the weld was very uniform along the length of tube, and the exterior surface was completely free of scratches. Furthermore, the invention insures continuous operation of the welding apparatus through continuous removal of spatter from the inside and outside of the welded tube.

Tubes of ferrous and non-ferrous metals ranging from ⅝ inch to 3½ inches outside diameter with wall thicknesses ranging from 0.020 inch to 0.110 inch have been successfully welded by the practice of the invention. Especially good results have been secured with deoxidized copper and low carbon steel. Zinc-containing copper-base alloys such as bronzes and brasses can be satisfactorily welded by the practice of the invention.

I claim:

1. In an apparatus for welding a longitudinal open seam in a tubular shape of weldable metal in which the tubular shape is progressively advanced through a welding zone where the edge portions of the seam are heated by an induced electric current of high frequency to welding temperature and the heated edges are forced together by pressure rolls to effect a weld, the improvement which comprises an induction coil positioned around the tubular shape and adapted to induce in the tubular shape a circumferentially flowing electric current, a permeable magnetic member positioned inside and as close as practicable to the tubular shape and within the influence of the magnetic field established by said induction coil, said permeable magnetic member directly underlying the open seam and a portion of the weld, and a seam guide extending into said open seam and adapted to maintain a seam width of at least one-fourth inch at a distance within the range of 4 to 7 inches in advance of said welding zone and thereby preventing the tubular shape acting as a shield around the magnetic member whereby the magnetic member effectively serves to increase the current flow in the tubular shape and the speed of welding by lowering the impedance of the combination of induction coil and tubular shape.

2. The improvement according to claim 1 characterized in that the seam width maintained by the seam guide is within the range of one-fourth to one-half inch.

3. In an apparatus for welding a longitudinal open seam in a tubular shape of weldable metal in which the tubular shape is progressively advanced through a welding zone where the edge portions of the same are heated to welding temperature by a circumferentially flowing electric current of high frequency induced by an induction coil surrounding the tubular shape and the heated edges are forced together by pressure rolls to effect a weld, the improvement which comprises a permeable magnetic member positioned inside the tubular shape and within the influence of the magnetic field established by said induction coil, said permeable magnetic member directly underlying the open seam and a portion of the weld, and a seam guide extending into said open seam and adapted to maintain the narrow triangle formed by the edges of the open seam between the seam guide and the weld point within the range of about 4 to about 5 degrees at the apex whereby the tubular shape is prevented from shielding the magnetic member and the latter effectively serves to increase the conductance of the combination of induction coil and tubular shape.

4. In an apparatus for welding a longitudinal open seam in a tubular shape of weldable metal in which the tubular shape is progressively advanced through a welding zone where the edge portions of the seam are heated to welding temperature by a circumferentially flowing electric current of high frequency induced by an induction coil surrounding the tubular shape and the heated edges are forced together by pressure rolls to effect a weld, the improvement which comprises a permeable magnetic member positioned inside the tubular shape and within the influence of the magnetic field established by said induction coil, said permeable magnetic member directly underlying the open seam and a portion of the weld, a heat-resistant insulating sleeve surrounding said magnetic core, a tubular nozzle extending through said open seam to said welding zone for removing spatter on the inside of the tubular shape, means for supplying a fluid coolant to said nozzle, and a suction exhaust hood mounted above the welding zone for drawing off spatter on the outside of the tubular shape.

5. In an apparatus for welding a longitudinal open seam in a tubular shape of weldable metal in which the tubular shape is progressively advanced through a welding zone and the edge portions of the seam are heated to welding temperature by a circumferentially flowing electric current of high frequency induced by an induction coil surrounding the tubular shape and the heated edges are forced together by pressure rolls to effect a weld, the improvement which comprises a generally cylindrical permeable magnetic member positioned inside the tubular shape and within the influence of the magnetic field established by said induction coil, said permeable magnetic member directly underlying the open seam and a portion of the weld, a heat-resistant insulating sleeve having a smooth exterior surface surrounding and enveloping the cylindrical surface of said magnetic member, an elongated needle-like tubular nozzle extending downwardly through said open seam to said welding zone and adapted to direct a jet of fluid coolant against spatter forming on the inside of the tubular shape, means for supplying a fluid coolant to said nozzle, and a suction exhaust hood mounted above said welding zone and adapted to withdraw spatter forming on the outside of the tubular shape.

6. In an apparatus for welding a longitudinal open seam in a tubular shape of weldable metal in which the tubular shape is progressively advanced through a welding zone and the edge portions of the seam are heated to welding temperature by a circumferentially flowing electric current of high frequency induced by an induction coil surrounding the tubular shape and the heated edges are forced together by pressure rolls to effect a weld, the improvement which comprises a permeable magnetic member positioned inside the tubular shape and within the influence of the magnetic field established by said induction coil, said permeable magnetic member directly underlying the open seam and a portion of the weld, a seam guide extending into said open seam and adapted to maintain a seam width of at least one-quarter inch at a distance within the range of 4 to 7 inches in advance of said welding zone, a heat-resistant insulating sleeve surrounding said magnetic core, a tubular nozzle extending through said open seam to said welding zone for removing spatter on the inside of the tubular shape, means for supplying a fluid coolant to said nozzle, and a suction exhaust hood mounted above the welding zone for drawing off spatter on the outside of the tubular shape.

7. In an apparatus for welding a longitudinal open seam in a tubular shape of weldable metal in which the tubular shape is progressively advanced through a welding zone and the edge portions of the seam are heated to welding temperature by a circumferentially flowing electric current of high frequency induced by an induction coil surrounding the tubular shape and the heated edges are forced together by pressure rolls to effect a weld, the improvement which comprises a generally cylindrical permeable magnetic member positioned inside and as close as practicable to the tubular shape and within the influence of the magnetic field established by said induction coil, said permeable magnetic member directly underlying the open seam and a portion of the weld, a seam guide extending into said open seam and adapted to maintain a seam width within the range of one-fourth to one-half inch at a distance within the range of 4 to 7 inches in advance of said welding zone, a heat-resistant insulating sleeve having a smooth exterior surface surrounding and enveloping the cylindrical surface of said magnetic member, an elongated needle-like tubular nozzle extending downwardly through said open seam to said welding zone and adapted to direct a jet of fluid coolant against spatter forming on the inside of the tubular shape, means for supplying a fluid coolant to said nozzle, and a suction exhaust hood mounted above said welding zone and adapted to withdraw spatter forming on the outside of the tubular shape.

References Cited in the file of this patent

UNITED STATES PATENTS

| | | |
|---|---|---|
| 1,967,129 | Neale | July 17, 1934 |
| 2,064,085 | Shippy | Dec. 15, 1936 |
| 2,146,430 | Hazen | Feb. 7, 1939 |
| 2,189,331 | Sower | Feb. 6, 1940 |
| 2,189,339 | Black et al. | Feb. 6, 1940 |
| 2,716,689 | Body | Aug. 30, 1955 |
| 2,912,549 | Dunn | Nov. 10, 1959 |
| 2,933,582 | Tower | Apr. 19, 1960 |